US012466426B2

(12) United States Patent
Cai et al.

(10) Patent No.: US 12,466,426 B2
(45) Date of Patent: Nov. 11, 2025

(54) COLLISION AVOIDANCE SYSTEM AND COLLISION AVOIDANCE METHOD

(71) Applicant: Wistron Corporation, New Taipei (TW)

(72) Inventors: Cheng Yang Cai, New Taipei (TW); Shang Jyun Heng, New Taipei (TW); Chih-Hao Chiu, New Taipei (TW)

(73) Assignee: Wistron Corporation, New Taipei (TW)

( * ) Notice: Subject to any disclaimer, the term of this patent is extended or adjusted under 35 U.S.C. 154(b) by 67 days.

(21) Appl. No.: 18/648,501

(22) Filed: Apr. 29, 2024

(65) Prior Publication Data

US 2025/0282371 A1 Sep. 11, 2025

(30) Foreign Application Priority Data

Mar. 6, 2024 (TW) ................................. 113108224

(51) Int. Cl.
*B60Q 1/00* (2006.01)
*B60W 30/095* (2012.01)
*B60W 50/14* (2020.01)
*G06V 10/60* (2022.01)
*G06V 20/58* (2022.01)

(52) U.S. Cl.
CPC ........ *B60W 50/14* (2013.01); *B60W 30/0956* (2013.01); *G06V 10/60* (2022.01); *G06V 20/58* (2022.01); *B60W 2050/143* (2013.01); *B60W 2420/403* (2013.01); *B60W 2420/408* (2024.01); *B60W 2554/80* (2020.02); *G06V 2201/07* (2022.01)

(58) Field of Classification Search
CPC ............ B60W 50/14; B60W 30/0956; B60W 2050/143; B60W 2420/403; B60W 2420/408; B60W 2554/80; G06V 10/60; G06V 20/58; G06V 2201/07
See application file for complete search history.

(56) References Cited

U.S. PATENT DOCUMENTS 9,571,755 B2 * 2/2017 Jang ...................... G11B 27/005
2017/0274876 A1 * 9/2017 Kim ...................... G01S 13/862
(Continued)

FOREIGN PATENT DOCUMENTS

JP 2021089732 6/2021

*Primary Examiner* — Toan N Pham
(74) *Attorney, Agent, or Firm* — JCIPRNET (57) ABSTRACT

A CAS and a collision avoidance method are provided. The collision avoidance method includes: detecting, by a radar, a first detection area and a second detection area to generate a detection result of a target object, where the second detection area includes the first detection area and is greater than the first detection area; determining whether the target object invades the first detection area or the second detection area based on the detection result; in response to determining that the target object invades the second detection area but does not invade the first detection area, calculating a first collision probability based on a first weight and the detection result; in response to determining that the target object invades the first detection area, calculating the first collision probability based on a second weight and the detection result; determining whether to output an alarm message based on the first collision probability.

20 Claims, 6 Drawing Sheets

(56) References Cited

U.S. PATENT DOCUMENTS

| | | |
|---|---|---|
| 2018/0137380 A1 | 5/2018 | Alrefai et al. |
| 2018/0162387 A1 | 6/2018 | Sung et al. |
| 2019/0232956 A1* | 8/2019 | Takaki .................. G01S 13/931 |
| 2020/0023837 A1 | 1/2020 | Yokoi |

* cited by examiner

COLLISION AVOIDANCE SYSTEM AND COLLISION AVOIDANCE METHOD

CROSS-REFERENCE TO RELATED APPLICATION

This application claims the priority benefit of Taiwan application serial no. 113108224, filed on Mar. 6, 2024. The entirety of the above-mentioned patent application is hereby incorporated by reference herein and made a part of this specification.

BACKGROUND

Technical Field

The disclosure relates to a radar system; more particularly, the disclosure relates to a collision avoidance system (CAS) of a carrier and a collision avoidance method.

Description of Related Art

A conventional CAS utilizes either a radar technology or an image recognition technology for detecting objects approaching a carrier. The CAS relying on the radar is susceptible to misjudgment due to interference from environmental noise, while the CAS employing the image recognition technology faces challenges in accurately determining the speed or the distance of objects. Consequently, ensuring the provision of a dependable and precise CAS remains a critical concern in the pertinent field.

SUMMARY

The disclosure provides a CAS and a collision avoidance method to detect objects approaching a carrier through a radar technology and an image recognition technology. According to an embodiment of the disclosure, a CAS is adapted to a carrier and includes a radar, an output device, and a processor. The processor is coupled to the radar and the output device and configured to: detect a first detection area and a second detection area through the radar to generate a detection result of a target object, where the second detection area includes the first detection area and is larger than the first detection area; determine whether the target object invades the first detection area or the second detection area based on the detection result; in response to determining that the target object invades the second detection area but does not invade the first detection area, calculate a first collision probability based on a first weight and the detection result; in response to determining that the target object invades the first detection area, calculate the first collision probability based on a second weight and the detection result; determine whether to output an alarm message based on the first collision probability; in response to determining to output the alarm message, output the alarm message through the output device.

In an embodiment of the disclosure, the CAS further includes an image capturing device. The image capturing device is coupled to the processor, where the processor is further configured to: capture an image of the first detection area and the second detection area through the image capturing device, determine a lighting state of the target object in the image, and calculate a total collision probability based on the first collision probability and the lighting state, and determine whether to output the alarm message based on the total collision probability.

In an embodiment of the disclosure, the processor is further configured to: determine whether the image matches the detection result based on a first time stamp of the detection result and a second time stamp of the image; in response to the image matching the detection result, determine the lighting state of the target object based on the image.

In an embodiment of the disclosure, the detection result includes a first distance, and the processor is further configured to: determine a second distance corresponding to the target object in the image based on the image; determine whether the second distance matches the first distance; in response to the second distance matching the first distance, determine the lighting state based on the target object in the image.

In an embodiment of the disclosure, the processor is further configured to: determine a time-to-collision (TTC) based on the detection result and calculate a total collision probability based on the first collision probability and the TTC, and determine whether to output the alarm message based on the total collision probability.

In an embodiment of the disclosure, the processor is further configured to: obtain the first detection area from a lookup table based on a speed per hour of the carrier.

In an embodiment of the disclosure, the processor is further configured to: in response to determining that the target object invades the second detection area but does not invade the first detection area, calculate the first collision probability based on a first distance between the carrier and a border of the first detection area, a second distance between the carrier and a border of the second detection area, the detection result, and the first weight.

In an embodiment of the disclosure, the processor is further configured to: in response to determining that the target object invades the first detection area, calculate the first collision probability based on a distance between the carrier and a border of the first detection area, the detection result, and the second weight.

In an embodiment of the disclosure, the output device includes an alarm lighting, and the processor is further configured to: calculate a total collision probability based on the first collision probability; in response to the total collision probability being greater than a first threshold value, determine to output the alarm message through the alarm lighting.

In an embodiment of the disclosure, the output device further includes a speaker, and the processor is further configured to: in response to the total collision probability being greater than a second threshold value, determine to output the alarm message through the speaker, where the second threshold value is greater than the first threshold value.

According to an embodiment of the disclosure, a collision avoidance method is adapted to a carrier and includes following steps. A first detection area and a second detection area are detected through a radar to generate a detection result of a target object, where the second detection area includes the first detection area and is larger than the first detection area. Whether the target object invades the first detection area or the second detection area is determined based on the detection result. In response to determining that the target object invades the second detection area but does not invade the first detection area, a first collision probability is calculated based on a first weight and the detection result. In response to determining that the target object invades the first detection area, the first collision probability is calculated based on a second weight and the detection result.

Whether to output an alarm message based on the first collision probability is determined. In response to determining to output the alarm message, the alarm message is output through an output device.

In an embodiment of the disclosure, the step of determining whether to output the alarm message based on the first collision probability includes: capturing an image of the first detection area and the second detection area through an image capturing device, determining a lighting state of the target object in the image and calculating a total collision probability based on the first collision probability and the lighting state, and determining whether to output the alarm message based on the total collision probability.

In an embodiment of the disclosure, the step of determining the lighting state of the target object in the image includes: determining whether the image matches the detection result based on a first time stamp of the detection result and a second time stamp of the image; in response to the image matching the detection result, determining the lighting state of the target object based on the image.

In an embodiment of the disclosure, the detection result includes a first distance, and the step of determining the lighting state of the target object based on the image includes: determining a second distance corresponding to the target object in the image based on the image; determining whether the second distance matches the first distance; in response to the second distance matching the first distance, determining the lighting state based on the target object in the image.

In an embodiment of the disclosure, the step of determining whether to output the alarm message based on the first collision probability includes: determining a TTC based on the detection result and calculating a total collision probability based on the first collision probability and the TTC, and determining whether to output the alarm message based on the total collision probability.

In an embodiment of the disclosure, the collision avoidance method further includes: obtaining the first detection area from a lookup table based on a speed per hour of the carrier.

In an embodiment of the disclosure, the step of calculating the first collision probability based on the first weight and the detection result includes: in response to determining that the target object invades the second detection area but does not invade the first detection area, calculating the first collision probability based on a first distance between the carrier and a border of the first detection area, a second distance between the carrier and a border of the second detection area, the detection result, and the first weight.

In an embodiment of the disclosure, the step of calculating the first collision probability based on the second weight and the detection result includes: in response to determining that the target object invades the first detection area, calculating the first collision probability based on a distance between the carrier and a border of the first detection area, the detection result, and the second weight.

In an embodiment of the disclosure, the output device includes an alarm lighting, and the step of determining whether to output the alarm message based on the first collision probability includes: calculating a total collision probability based on the first collision probability; in response to the total collision probability being greater than a first threshold value, determining to output the alarm message through the alarm lighting.

In an embodiment of the disclosure, the output device further includes a speaker, and the step of determining whether to output the alarm message based on the first collision probability includes: in response to the total collision probability being greater than a second threshold value, determining to output the alarm message through the speaker, where the second threshold value is greater than the first threshold value.

In view of the above, the CAS provided in one or more embodiments of the disclosure is capable of accurately detecting the speed or the distance of the target object approaching the carrier, thereby determining whether to issue an alarm message. In addition, the CAS provided in one or more embodiments of the disclosure is designed to withstand the interference caused by environmental noise, thus demonstrating strong reliability.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
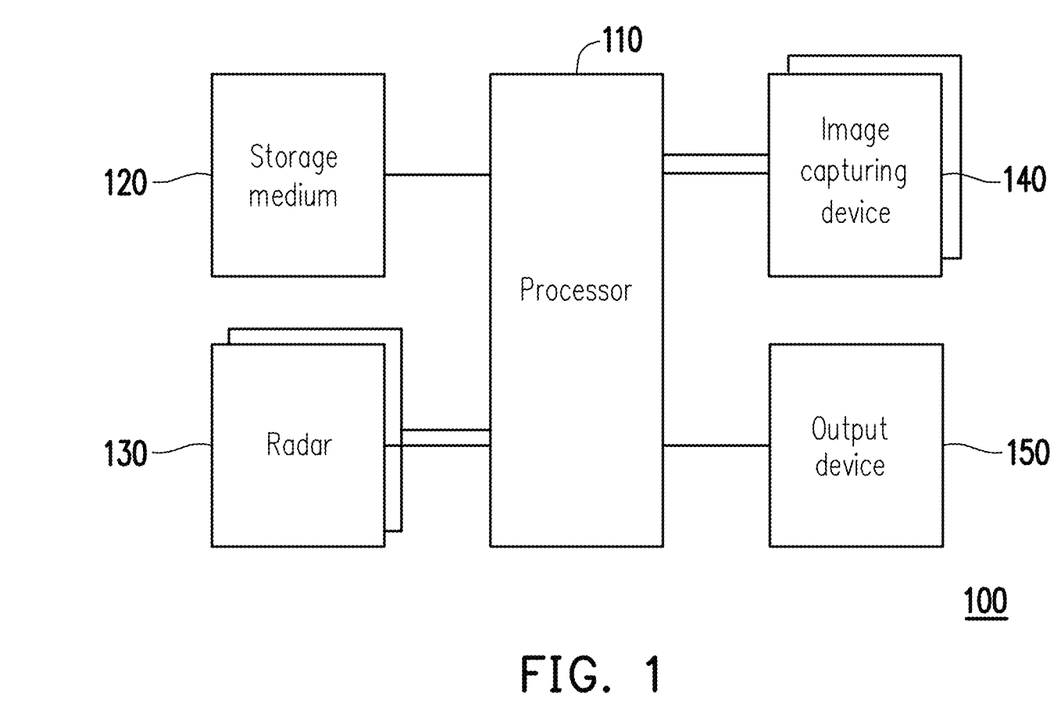
FIG. 1 is a schematic view of a CAS according to an embodiment of the disclosure.
Figure 2:
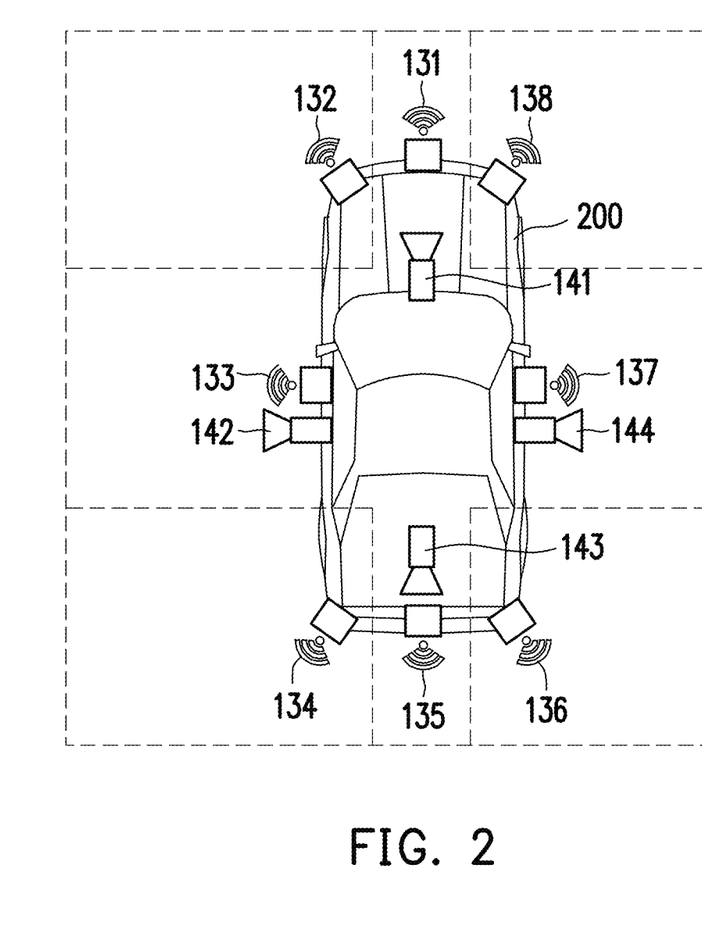
FIG. 2 is a schematic view of the configuration of a sensor of a carrier according to an embodiment of the disclosure.
Figure 4:
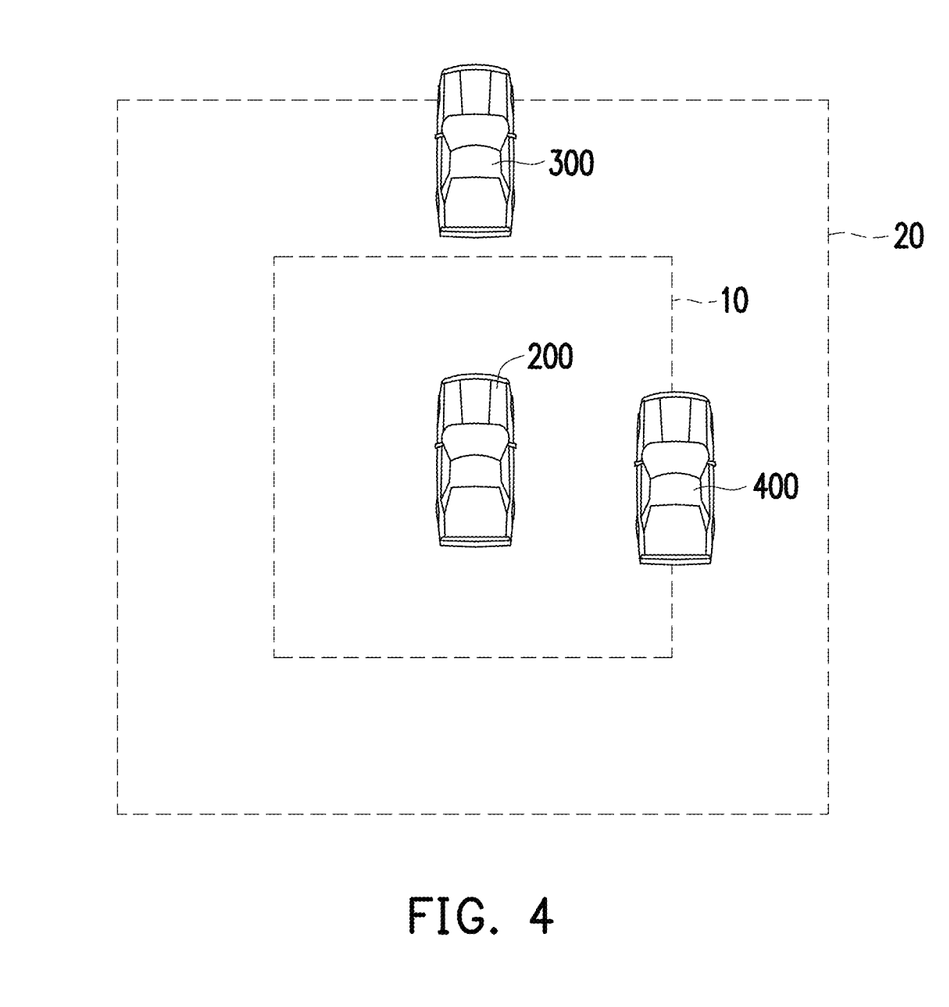
FIG. 4 and FIG. 5 are top views of a moving carrier according to an embodiment of the disclosure.

FIG. 1 is a schematic view of a CAS 100 according to an embodiment of the disclosure, where the CAS 100 is adapted to detect a target object (for instance, a target object 300 or 400 as shown in FIG. 4) approaching a carrier (for instance, a carrier 200 as shown in FIG. 2). The CAS 00 may include a processor 110, a storage medium 120, one or more radars 130, one or more image capturing devices 140, and an output device 150.

The processor 110 is, for instance, a central processing unit (CPU) or any other programmable general-purpose or special-purpose micro control unit (MCU), microprocessor, digital signal processor (DSP), programmable controller, application-specific integrated circuit (ASIC), graphics processing unit (GPU), image signal processor (ISP), image processing unit (IPU), arithmetic logic unit (ALU), complex programmable logic device (CPLD), field programmable gate array (FPGA), any other similar component, or combinations of the aforementioned components. The processor 110 may be coupled to the storage medium 120, the radar 130, the image capturing device 140, and the output device 150, and may access and execute a plurality of modules and applications stored in the storage medium 120. In an embodiment, the processor 110 may be communicatively connected to an electronic control system of the carrier and control the carrier. For instance, the processor 110 may control the carrier to brake or to evade.

The storage medium 120 is, for instance, any type of fixed or movable random access memory (RAM), read-only memory (ROM), flash memory, hard disk drive (HDD), solid state drive (SSD), similar component, or combinations of the aforementioned components, and the storage medium 120 is configured to store a plurality of modules or applications that can be executed by the processor 110.

The radar 130 is, for instance, a pulse compression radar. A detection result obtained through the radar 130 may be applied to determine the distance, the relative speed, or the time-to-collision (TTC) between different objects.

The image capturing device 140 is, for instance, a camera or a photographic device configured to capture images. The image capturing device 140 may include an image sensor, such as a complementary metal oxide semiconductor (CMOS) or a charge coupled device (CCD). The images captured by the image capturing device 140 may be used to determine the lighting state of the target object.

The processor 110 may output an alarm message through the output device 150, where the alarm message serves to alert a driver that the target object is approaching the carrier and there is a possibility of collision between the two. The output device 150 may include but is not limited to lighting, a display, or a speaker. That is, the output device 150 may be configured to output the alarm message in form of a light signal, an image, sound, or the like.

One or more radars 130 or one or more image capturing devices 140 may be separately arranged on the carrier to monitor the surroundings of the carrier. FIG. 2 is a schematic view of the configuration of a sensor of a carrier 200 according to an embodiment of the disclosure. In an embodiment, the radar 130 may include a radar 131 for detecting the front of the carrier 200, a radar 132 for detecting the left front of the carrier 200, a radar 133 for detecting the left side of the carrier 200, a radar 134 for detecting the left rear of the carrier 200, a radar 135 for detecting the rear of the carrier 200, a radar 136 for detecting the right rear of the carrier 200, a radar 137 for detecting the right side of the carrier 200, and a radar 138 for detecting the right front of the carrier 200. The image capturing device 140 may include an image capturing device 141 for monitoring the front of the carrier 200, an image capturing device 142 for monitoring the left side of the carrier 200, an image capturing device 143 for monitoring the rear of the carrier 200, and an image capturing device 144 for monitoring the right side of the carrier 200.

Figure 3:
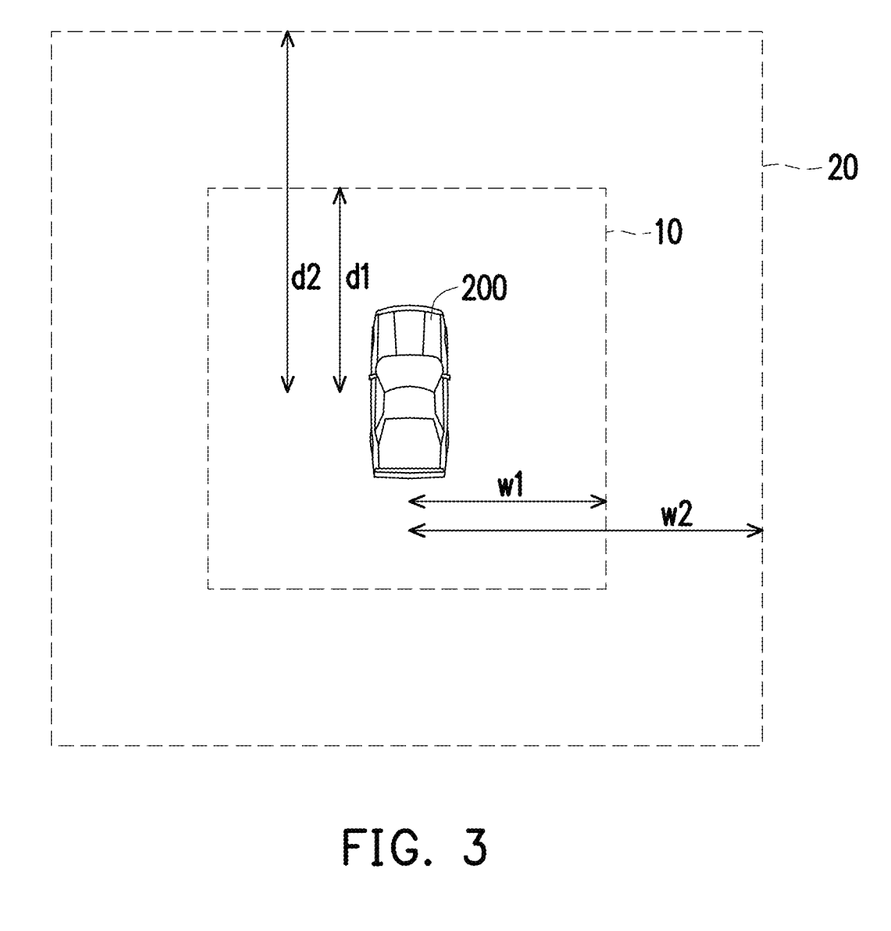
FIG. 3 is a schematic view of a detection area of a radar according to an embodiment of the disclosure.

The processor 110 may generate detection results of the target object by detecting one or more detection areas through the radar. The detection result may indicate whether the target object exists, the distance between the target object and the carrier 200, the relative speed of the target object and the carrier 200, or the TTC of the target object and the carrier 200. FIG. 3 is a schematic view of a detection area of a radar 130 according to an embodiment of the disclosure. In an embodiment, the detection area of the radar 130 may include a detection area 10 and a detection area 20, where the detection area 20 may include the detection area 10 and may be larger than the detection area 10. The processor 110 may determine whether the target object (e.g., the target object 400) invades the detection area 10 or the detection area 20 based on the detection result obtained through the radar 130. Compared to the target object that simply invades the detection area 20 without invading the detection area 10, the target object that invades the detection area 10 poses a greater danger to the carrier.

The processor 110 may be communicatively coupled to an instrument system of the carrier 200 to obtain the speed per hour of the carrier 200. The processor 110 may obtain the detection area 10 or the detection area 20 from a lookup table based on the speed per hour of the carrier 200. The lookup table may be associated with a reaction distance required by the driver for activating the brake of the carrier 200 or a braking distance required by the brake for stopping the carrier 200. For instance, the processor 110 may set the detection area 10 to ensure the minimum distance between a border of the detection area 10 and a center point of the carrier 200 is equal to the reaction distance corresponding to the speed per hour of the carrier 200. The processor 110 set configure the detection area 20 to ensure that the minimum distance between a border of the detection area 20 and the center point of the carrier 200 is equal to the sum of the reaction distance and the braking distance corresponding to the speed per hour of the carrier 200.

TABLE 1

| Speed per hour (kilometers/hour) | 20 | 30 | 40 | 50 | 60 | ... | 100 |
|---|---|---|---|---|---|---|---|
| Reaction distance (meters) | 5.56 | 8.33 | 11.11 | 13.89 | 16.67 | ... | 27.7 |
| Braking distance (meters) | 10 | 15 | 20 | 25 | 30 | ... | 50 |
| Sum (meters) | 15.56 | 23.33 | 31.11 | 38.89 | 46.67 | ... | 77.7 |

Table 1 is an example of lookup table. Assuming the speed per hour of the carrier 200 is 20 kilometers/hour, the processor 110 may determine, based on the lookup table, that the minimum distance (e.g., a distance d1 or a distance w1) between the border of the detection area 10 and the center point (or the chassis) of the carrier 200 is 5.56 meters (i.e., the reaction distance corresponding to 20 kilometers/hour), and determine that the minimum distance between the border of the detection area 20 and the center point (or the chassis) of the carrier 200 is 15.56 meters (i.e., the sum of the reaction distance and the braking distance corresponding to 20 kilometers/hour).

The detection result of the target object obtained through the radar 130 may indicate whether the target object invades the detection area 20 or the detection area 10. The processor 110 may calculate a collision probability $P_{area}$ of the target object colliding the carrier based on the detection result through the radar 130 if the target object simply invades the detection area 20 without invading the detection area 10 or if the target object invades the detection area 10, as shown in formula (1), where D is the distance between the target object and the carrier 200, and $J_{10}$ and $J_{20}$ are weights, $D_{20}$=w2 (or $D_{20}$=d2), and $D_{10}$=w1 (or $D_{10}$=d1). Table 2 shows the relationship between the weights $J_{10}$ and $J_{20}$ and the detection result of the target object. The processor 110 may calculate the collision probability $P_{area}$ based on the formula (1) based on the content recorded in Table 2. In an embodiment, the processor 110 may determine to output an alarm message (or control the carrier 200 to brake or evade) when the collision probability $P_{area}$ is greater than a threshold value, or determine not to output any alarm message when the collision probability $P_{area}$ is less than or equal to the threshold value.

$$P_{area} = \left( \frac{25}{D_{20} - D_{10}} \cdot (D_{20} - D) \right) \cdot J_{20} + \left( \frac{25}{D_{10}} \cdot (D_{10} - D) + 25 \right) \cdot J_{10} \quad (1)$$

TABLE 2

| Detection result | $J_{20}$ | $J_{10}$ |
| --- | --- | --- |
| The target object is located directly in front of, directly behind, directly to the left of, or directly to the right of the carrier 200 and invades the detection area 20 without invading the detection area 10 | 1 | 0 |
| The target object is located directly in front of, directly behind, directly to the left of, or directly to the right of the carrier 200 and invades the detection area 10 | 0 | 1 |
| The target object is located to the left front, the right front, the left rear, or the right rear of the carrier 200 and invades the detection area 20 without invading the detection area 10 | 0.5 | 0 |
| The target object is located to the left front, the right front, the left rear, or the right rear of the carrier 200 and invades the detection area 10 | 0 | 0.5 |

The processor 110 may capture images of the detection area 10 and the detection area 20 through the image capturing device 140 and perform image recognition on the images to determine the lighting state of the target object in the images. The processor 110 may calculate a collision probability $P_{reaction}$ of the target object and the carrier 200 based on the lighting state of the target object, as shown in formula (2), where $P_{approaching}$ is a variable associated with the lighting state, and TTC is the TTC of the target object obtained by the processor 110 based on the detection result obtained through the radar 130. In an embodiment, if the TTC is less than 2.8 seconds, the processor 110 may set the collision probability $P_{reaction}$ to 50%. In other words, if the TTC is greater than or equal to 2.8 seconds, the processor 110 may set the collision probability $P_{reaction}$ as shown in the formula (2). In an embodiment, if the processor 110 determines that the lighting state of the target object (e.g., a tail light or a direction signal) is "enabled", the processor 110 may set the variable $P_{approaching}$ to 25%. If the processor 110 determines that the lighting state of the target object is "disabled", the processor 110 may set the variable $P_{approaching}$ to 0%. In an embodiment, the processor 110 may determine to output the alarm message (or control the carrier 200 to brake or evade) when the collision probability $P_{reaction}$ is greater than the threshold value, or determine not to output any alarm message when the collision probability $P_{reaction}$ is less than or equal to the threshold value.

$$P_{reaction} = \frac{50 - P_{approaching}}{2.8} \cdot \left(1 - \frac{TTC - 2.8}{2.8}\right) \quad (2)$$

In an embodiment, the processor 110 may calculate the total collision probability $P_{total}$ of the target object and the carrier 200 according to formula (3), where α is a self-defined value (e.g., α=25%), β=$P_{area}$+$P_{reaction}$, $P_{approaching}$=0 represents that the processor 110 determines the lighting state of the target object as "disabled", and $P_{approaching} \neq 0$ represents that the processor 110 determines the lighting state of the target object as "enabled". The processor 110 may determine to output an alarm message (or control the carrier 200 to brake or evade) when the total collision probability $P_{total}$ is greater than the threshold value, or determine not to output any alarm message when the total collision probability $P_{total}$ is less than or equal to the threshold value.

$$P_{total} = P_{area} + P_{reaction} \quad (3)$$

$$P_{total} = \begin{cases} P_{area} + P_{reaction}, & \text{if } P_{approaching} = 0 \text{ and } \beta \leq 100\% \\ P_{area} + P_{reaction} + \alpha, & \text{if } P_{approaching} \neq 0 \text{ and } \beta \leq 100\% \\ 100\%, & \text{if } \beta > 100\% \end{cases} \quad (3)$$

In an embodiment, the processor 110 may determine whether the image captured by the image capturing device 140 matches the detection result obtained through the radar 130 based on a time stamp. Specifically, the processor 110 may determine whether the time stamp of the detection result matches a time stamp of the image. If the time stamps of the two match, then the processor 110 may determine that the image matches the detection result. If the time stamps of the two do not match, then the processor 110 may determine that the image does not match the detection result. If the image matches the detection result obtained through the radar 130, it indicates that the image may serve to compensate or improve the detection result obtained through the radar 130. Accordingly, the processor 110 may perform image recognition on the image to determine the lighting state (e.g., a direction light or a brake light) of the target object (e.g., a carrier such as a car or a motorcycle). If the image does not match the detection result obtained through the radar 130, it indicates that the image cannot compensate or improve the detection result obtained through the radar 130. Accordingly, the processor 110 may not perform image recognition on the image. That is, the processor 110 may not determine the lighting state of the target object in the image. The matched detection result and lighting state may be applied to calculate the total collision probability of the target object and the carrier 200.

In an embodiment, the processor 110 may determine whether the image captured by the image capturing device 140 matches the detection result obtained through the radar 130 based on the distance. Specifically, the processor 110 may determine a first distance between the target object and the carrier 200 from the detection result obtained through the radar 130 and may determine a second distance between the target object in the image and the carrier 200 from the image captured by the image capturing device 140. If the first distance matches the second distance (e.g., the absolute difference between the first distance and the second distance is less than or equal to the threshold value), it indicates that the target object in the image matches the target object in the detection result obtained through the radar 130 (i.e., the two target objects are the same). Accordingly, the processor 110 may perform image recognition on the image to determine the lighting state of the target object. If the first distance does not match the second distance (e.g., the absolute difference between the first distance and the second distance is greater than the threshold value), it indicates that the target object in the image does not match the target object in the detection result obtained through the radar 130 (i.e., the two target objects are different). Accordingly, the processor 110 may not perform image recognition on the image. That is, the processor 110 may not determine the lighting state of the target object in the image. In an embodiment, the processor 110 may project the image and the detection result obtained through the radar 130 onto the same coordinate system to calculate the absolute difference between the first distance and the second distance.

Figure 5:
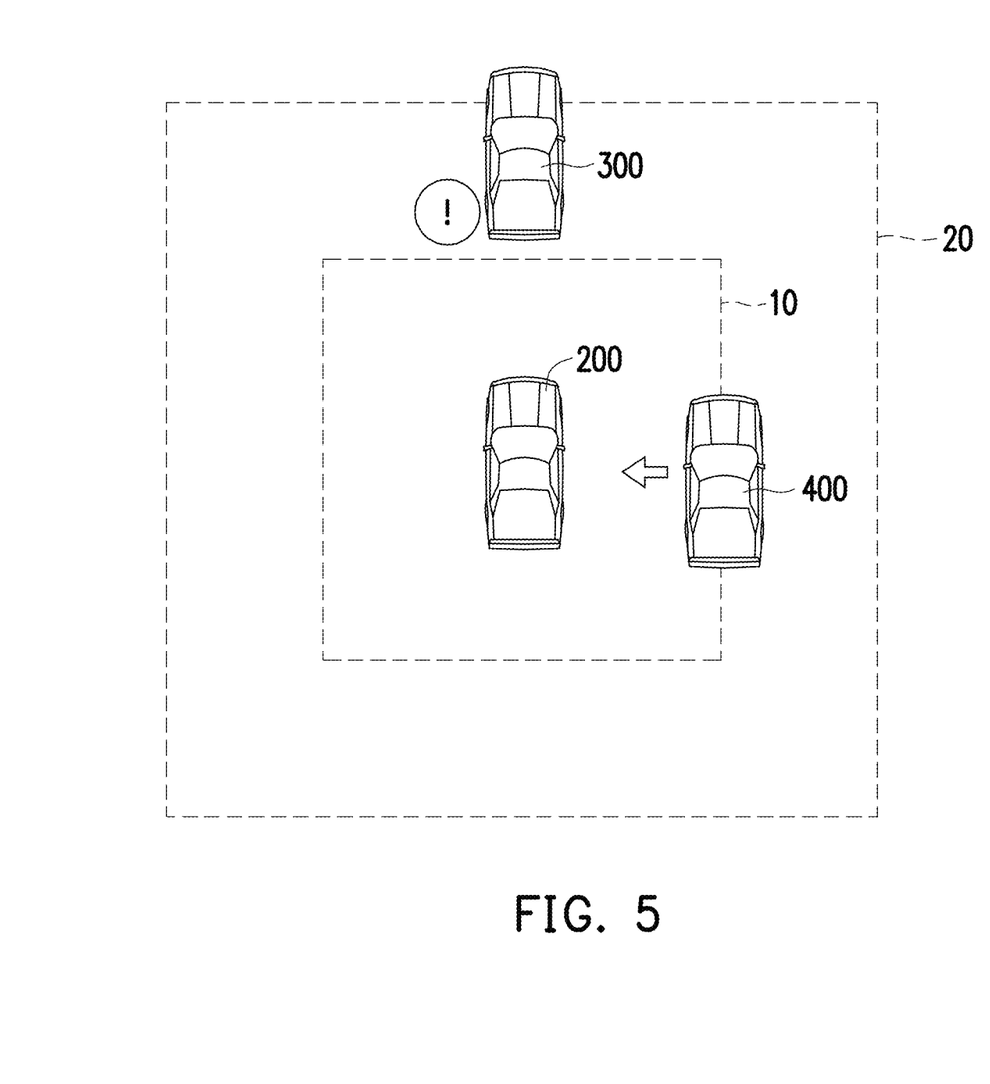

FIG. 4 and FIG. 5 are top views of a moving carrier 200 according to an embodiment of the disclosure. For instance, assuming the speed per hour of the carrier 200 is 60 kilometers/hour, $D_{10}$ is 16.67 kilometers/hour, and $D_{20}$ is 46.67 kilometers/hour, the lighting state of the target object 300 is "disabled" (as shown in FIG. 4), the speed per hour of the target object 300 is 30 kilometers/hour, the relative speed of the carrier 200 and the target object 300 is |30−60|=30 km/hr=8.33 m/s, the distance between the carrier 200 and the target object 300 is 30 meters, and the TTC between the carrier 200 and the target object 300 is 3.6 seconds (the distance/the relative speed=3.6). The processor 110 may determine that the target object 300 has invaded the detection area 20 in front of the carrier 200 based on the detection result obtained through the radar 130. Accordingly, the processor 110 may calculate the collision probability $P_{area}$, the collision probability $P_{reaction}$, or the total collision probability $P_{total}$ corresponding to the target object 300 according to the formulas (1)-(3), as shown in formulas (4)-(6).

$$P_{area} = \left(\frac{25}{46.67-16.67} \cdot (46.67-30)\right) \cdot 1 = 13.9\% \quad (4)$$

$$P_{reaction} = \frac{50-0}{2.8} \cdot \left(1 - \frac{3.6-2.8}{2.8}\right) = 12.8\% \quad (5)$$

$$P_{total} = 13.9\% + 12.8\% = 26.7\% \quad (6)$$

Assuming the $\alpha$ equals to 25% in the formula (3), if the lighting state of the target object 300 is "enabled" (for instance, the brake light is enabled as shown in FIG. 5), then the collision probability $P_{reaction}$ or the total collision probability $P_{total}$ may be updated to what is shown in formulas (7)-(8).

$$P_{reaction} = \frac{50-25}{2.8} \cdot \left(1 - \frac{3.6-2.8}{2.8}\right) = 6.4\% \quad (7)$$

$$P_{total} = 13.9\% + 6.4\% + 25\% = 45.3\% \quad (8)$$

For instance, assuming the speed per hour of the carrier 200 is 60 kilometers/hour, $D_{10}$ is 16.67 kilometers/hour, and $D_{20}$ is 46.67 kilometers/hour, the lighting state of the target object 400 is "disabled" (as shown in FIG. 4); when the speed per hour of the target object 400 is 40 kilometers/hour, the relative speed between the carrier 200 and the target object 300 is |40−60|=20 km/hr=5.56 m/s, the distance between the carrier 200 and the target object 400 is 3 meters, and the TTC between the carrier 200 and the target object 400 is 0.54 seconds (the distance/the relative speed=0.54). The processor 110 may determine that the target object 400 has invaded the detection area 10 on the right side of the carrier 200 based on the detection result obtained through the radar 130. Accordingly, the processor 110 may calculate the collision probability $P_{area}$, the collision probability $P_{reaction}$, or the total collision probability $P_{total}$ corresponding to the target object 400 according to the formulas (1)-(3), as shown in formulas (9)-(11). Since the TTC is less than 2.8 seconds, the processor 110 may set the collision probability $P_{reaction}$ to 50%. Since the sum of the collision probability $P_{area}$ and the collision probability $P_{reaction}$ exceeds 100%, the processor 110 may determine $P_{total}$=100%.

$$P_{area} = \left(\left(\frac{25}{16.67}\right) \cdot (16.67-3) + 25\right) \cdot 1 = 58\% \quad (9)$$

$$P_{reaction} = 50\% \quad (10)$$

$$P_{total} = 100\% \quad (11)$$

Even though the lighting state of the target object 400 is changed to "enabled" (e.g., the direction light shown in FIG. 5 is enabled), since the TTC is less than 2.8 seconds, the collision probability $P_{reaction}$ remains at 50%, and the sum of the collision probability $P_{area}$ and the collision probability $P_{reaction}$ is still 108%. In an embodiment, it may be learned from the above formula (3) that when the sum of the collision probability $P_{area}$ and the collision probability $P_{reaction}$ exceeds 100%, the sum is considered as 100%.

Figure 6:
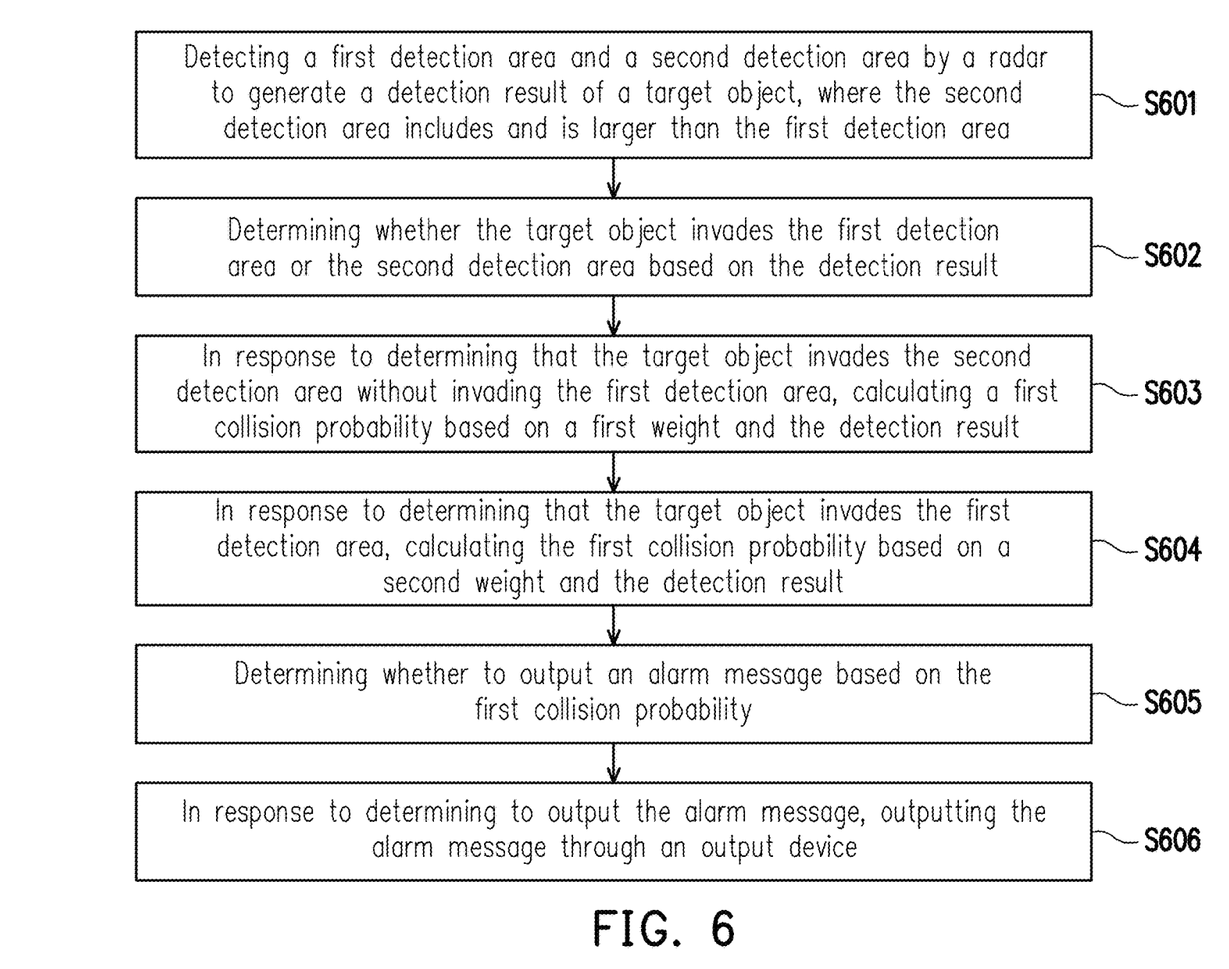
FIG. 6 is a flowchart of a collision avoidance method according to an embodiment of the disclosure.

FIG. 6 is a flowchart of a collision avoidance method according to an embodiment of the disclosure, where the collision avoidance method may be implemented by the CAS 100 shown in FIG. 1. In step S601, a first detection area and a second detection area are detected by a radar to generate a detection result of a target object, where the second detection area includes the first detection area and is larger than the first detection area. In step S602, it is determined whether the target object invades the first detection area or the second detection area based on the detection result. In step S603, in response to determining that the target object invades the second detection area without invading the first detection area, a first collision probability is calculated based on a first weight and the detection result. In step S604, in response to determining that the target object invades the first detection area, the first collision probability is calculated based on a second weight and the detection result. In step S605, it is determined whether to output an alarm message based on the first collision probability. In step S606, in response to determining to output the alarm message, the alarm message is output through an output device.

To sum up, the CAS provided in one or more embodiments of the disclosure may determine, based on the collision probability, whether to output the alarm message when the target object approaches the carrier, thereby alerting the driver to potential hazards. This collision probability may be associated with both the driver's reaction time and the braking distance of the carrier. In addition, the CAS can calculate the collision probability based on the lighting state of the target object.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A collision avoidance system, adapted to a carrier and comprising:
   a radar;
   an output device; and
   a processor, coupled to the radar and the output device and configured to:
      detect a first detection area and a second detection area through the radar to generate a detection result of a target object, wherein the second detection area comprises the first detection area and is larger than the first detection area;
      determine whether the target object invades the first detection area or the second detection area based on the detection result;

in response to determining that the target object invades the second detection area but does not invade the first detection area, calculate a first collision probability based on a first weight and the detection result;

in response to determining that the target object invades the first detection area, calculate the first collision probability based on a second weight and the detection result;

determine whether to output an alarm message based on the first collision probability; and in response to determining to output the alarm message, output the alarm message through the output device.

2. The collision avoidance system according to claim 1, further comprising:

an image capturing device, coupled to the processor, wherein the processor is further configured to:

capture an image of the first detection area and the second detection area through the image capturing device;

determine a lighting state of the target object in the image, and calculate a total collision probability based on the first collision probability and the lighting state; and determine whether to output the alarm message based on the total collision probability.

3. The collision avoidance system according to claim 2, wherein the processor is further configured to:

determine whether the image matches the detection result based on a first time stamp of the detection result and a second time stamp of the image; and in response to the image matching the detection result, determine the lighting state of the target object based on the image.

4. The collision avoidance system according to claim 3, wherein the detection result comprises a first distance, and the processor is further configured to:

determine a second distance corresponding to the target object in the image based on the image;

determine whether the second distance matches the first distance; and in response to the second distance matching the first distance, determine the lighting state based on the target object in the image.

5. The collision avoidance system according to claim 1, wherein the processor is further configured to:

determine a time-to-collision based on the detection result, and calculate a total collision probability based on the first collision probability and the time-to-collision; and determine whether to output the alarm message based on the total collision probability.

6. The collision avoidance system according to claim 1, wherein the processor is further configured to:

obtain the first detection area from a lookup table based on a speed per hour of the carrier.

7. The collision avoidance system according to claim 1, wherein the processor is further configured to:

in response to determining that the target object invades the second detection area but does not invade the first detection area, calculate the first collision probability based on a first distance between the carrier and a border of the first detection area, a second distance between the carrier and a border of the second detection area, the detection result, and the first weight.

8. The collision avoidance system according to claim 1, wherein the processor is further configured to:

in response to determining that the target object invades the first detection area, calculate the first collision probability based on a distance between the carrier and a border of the first detection area, the detection result, and the second weight.

9. The collision avoidance system according to claim 1, wherein the output device comprises an alarm lighting, and the processor is further configured to:

calculate a total collision probability based on the first collision probability; and in response to the total collision probability being greater than a first threshold value, determine to output the alarm message through the alarm lighting.

10. The collision avoidance system according to claim 9, wherein the output device further comprises a speaker, and the processor is further configured to:

in response to the total collision probability being greater than a second threshold value, determine to output the alarm message through the speaker, wherein the second threshold value is greater than the first threshold value.

11. A collision avoidance method, adapted to a carrier and comprising:

detecting a first detection area and a second detection area through a radar to generate a detection result of a target object, wherein the second detection area comprises the first detection area and is larger than the first detection area;

determining whether the target object invades the first detection area or the second detection area based on the detection result;

in response to determining that the target object invades the second detection area but does not invade the first detection area, calculating a first collision probability based on a first weight and the detection result;

in response to determining that the target object invades the first detection area, calculating the first collision probability based on a second weight and the detection result;

determining whether to output an alarm message based on the first collision probability; and in response to determining to output the alarm message, outputting the alarm message through an output device.

12. The collision avoidance method according to claim 11, wherein the step of determining whether to output the alarm message based on the first collision probability comprises:

capturing an image of the first detection area and the second detection area through an image capturing device;

determining a lighting state of the target object in the image, and calculating a total collision probability based on the first collision probability and the lighting state; and determining whether to output the alarm message based on the total collision probability.

13. The collision avoidance method according to claim 12, wherein the step of determining the lighting state of the target object in the image comprises:

determining whether the image matches the detection result based on a first time stamp of the detection result and a second time stamp of the image; and in response to the image matching the detection result, determining the lighting state of the target object based on the image.

14. The collision avoidance method according to claim 13, wherein the detection result comprises a first distance, and the step of determining the lighting state of the target object based on the image comprises:

determining a second distance corresponding to the target object in the image based on the image;

determining whether the second distance matches the first distance; and in response to the second distance matching the first distance, determining the lighting state based on the target object in the image.

15. The collision avoidance method according to claim 11, wherein the step of determining whether to output the alarm message based on the first collision probability comprises:

determining a time-to-collision based on the detection result, and calculating a total collision probability based on the first collision probability and the time-to-collision; and determining whether to output the alarm message based on the total collision probability.

16. The collision avoidance method according to claim 11, further comprising:

obtaining the first detection area from a lookup table based on a speed per hour of the carrier.

17. The collision avoidance method according to claim 11, wherein the step of calculating the first collision probability based on the first weight and the detection result comprises:

in response to determining that the target object invades the second detection area but does not invade the first detection area, calculating the first collision probability based on a first distance between the carrier and a border of the first detection area, a second distance between the carrier and a border of the second detection area, the detection result, and the first weight.

18. The collision avoidance method according to claim 11, wherein the step of calculating the first collision probability based on the second weight and the detection result comprises:

in response to determining that the target object invades the first detection area, calculating the first collision probability based on a distance between the carrier and a border of the first detection area, the detection result, and the second weight.

19. The collision avoidance method according to claim 11, wherein the output device comprises an alarm lighting, and the step of determining whether to output the alarm message based on the first collision probability comprises:

calculating a total collision probability based on the first collision probability; and in response to the total collision probability being greater than a first threshold value, determining to output the alarm message through the alarm lighting.

20. The collision avoidance method according to claim 19, wherein the output device further comprises a speaker, and the step of determining whether to output the alarm message based on the first collision probability comprises:

in response to the total collision probability being greater than a second threshold value, determining to output the alarm message through the speaker, wherein the second threshold value is greater than the first threshold value.

* * * * *